United States Patent [19]
Naimpally

[11] Patent Number: 6,130,720
[45] Date of Patent: Oct. 10, 2000

[54] METHOD AND APPARATUS FOR PROVIDING A VARIETY OF INFORMATION FROM AN INFORMATION SERVER

[75] Inventor: Saiprasad V. Naimpally, Langhorne, Pa.

[73] Assignee: Matsushita Electric Industrial Co., Ltd., Osaka, Japan

[21] Appl. No.: 08/797,922

[22] Filed: Feb. 10, 1997

[51] Int. Cl.⁷ ............................. H04N 7/00; H04N 11/00; H04N 5/445

[52] U.S. Cl. ........................................... 348/553; 348/564

[58] Field of Search ................................. 348/1–12, 468, 348/563, 564, 565, 589, 553; H04N 7/00, 11/00, 5/445

[56] References Cited

U.S. PATENT DOCUMENTS

| | | | |
|---|---|---|---|
| 4,740,912 | 4/1988 | Whitaker . | |
| 4,751,578 | 6/1988 | Reiter et al. . | |
| 4,812,843 | 3/1989 | Champion, III et al. . | |
| 4,845,564 | 7/1989 | Hakamada et al. | 348/565 |
| 4,928,177 | 5/1990 | Martinez . | |
| 4,984,174 | 1/1991 | Yasunobu et al. . | |
| 5,027,400 | 6/1991 | Baji et al. . | |
| 5,121,476 | 6/1992 | Yee . | |
| 5,131,020 | 7/1992 | Liebesny et al. . | |
| 5,168,353 | 12/1992 | Walker et al. . | |
| 5,182,555 | 1/1993 | Sumner . | |
| 5,247,347 | 9/1993 | Litteral et al. | 348/7 |
| 5,327,498 | 7/1994 | Hamon . | |
| 5,361,091 | 11/1994 | Lauder et al. . | |
| 5,375,160 | 12/1994 | Guidon et al. . | |
| 5,444,499 | 8/1995 | Mitsumasa . | |
| 5,550,576 | 8/1996 | Klosterman | 348/906 |
| 5,550,577 | 8/1996 | Verbiest et al. | 348/7 |
| 5,557,338 | 9/1996 | Maze et al. | 348/563 |
| 5,559,548 | 9/1996 | Davis et al. | 348/906 |
| 5,559,550 | 9/1996 | Mankovitz | 348/906 |
| 5,576,755 | 11/1996 | Davis et al. . | |
| 5,585,838 | 12/1996 | Lawler et al. | 348/906 |
| 5,585,865 | 12/1996 | Amano et al. | 348/906 |
| 5,592,551 | 1/1997 | Lett et al. | 348/12 |
| 5,602,598 | 2/1997 | Shintani | 348/565 |
| 5,619,274 | 4/1997 | Roop et al. | 348/906 |
| 5,657,072 | 8/1997 | Aristides et al. . | |
| 5,684,525 | 11/1997 | Klosterman . | |
| 5,805,763 | 9/1998 | Lawler et al. | 348/13 |

FOREIGN PATENT DOCUMENTS

| | | |
|---|---|---|
| 757 485 A2 | 2/1997 | European Pat. Off. . |
| 62-60378 | 3/1987 | Japan . |
| 8-275077 | 10/1996 | Japan . |

OTHER PUBLICATIONS

Harigai et al.; "LSI Chip Set for Closed Captioned Decoder System;" *IEEE Transactions on Consumer Electronics*; vol. 37; No. 3; pp. 449–454 (Aug. 1991).

Moller et al.; "A Single Chip Solution for Closed–Captioning Decoding;" *IEEE Transactions on Consumer Electronics*; vol. 38; No. 3; pp. 274–278 (Aug. 1992).

O'Malley; "Text–to–Speech Conversion Technology;" *Computer*; vol. 23; No. 8; pp. 17–23 (Aug. 1990).

Letter from Information Highway Media Corporation, dated Nov. 2, 1995.

K. Blair Benson, "Broadcast Information Services", *Television Engineering Handbook Featuring HDTV Systems*, pp. 14.131–14.152.

*Primary Examiner*—Howard Britton
*Assistant Examiner*—Nhon T. Diep
*Attorney, Agent, or Firm*—Ratner & Prestia

[57] ABSTRACT

A method and apparatus for requesting, receiving, processing, and providing local information from a single local source to a television viewer. A local information provider is accessed via a communications link and specific data, which is separate and distinct from video signals received by the television receiver, is downloaded to the television receiver. The data provided by the local source is minimally formatted without any graphical overhead. Requests for information from the local source may be on demand or at a predetermined time.

15 Claims, 5 Drawing Sheets

METHOD AND APPARATUS FOR PROVIDING A VARIETY OF INFORMATION FROM AN INFORMATION SERVER

FIELD OF THE INVENTION

The present invention generally relates to receiving information from a service provider and, more particularly, it relates to obtaining information from a local information provider (IP) and providing this information to a user. Information such as local news, weather, movie theater schedules, sports, advertising, electronic program guides (EPGs), and other types of local information of interest to the user of the IP may be provided.

BACKGROUND OF THE INVENTION

In the 1980's Teletext services were available in some parts of the United States to display information obtained from an information provider on a television receiver. In the Teletext system, the information provider transmits data that it chooses to send during the vertical blanking interval (VBI) of a television signal. This information includes both text and graphics information. Receivers equipped with a Teletext decoder are able to receive, decode and display this information.

Because the information is transmitted only during the vertical blanking interval of the received television signal, it has a relatively low data rate. Consequently, the information displayed is usually short and simple. Unless the Teletext receiver includes facilities for collecting and storing data over longer intervals, for example overnight while the television receiver is turned off.

Videotex is an interactive version of Teletext. In a Videotex system, data may be provided in substantially the same way as in a Teletext system but it is provided in response to a user request provided via a telephone link. Some Videotex systems, such as the ANTIOPE system used in France, allow data to be sent in a full television channel bandwidth. This results in a bit rate for the data of 6.203 Mbits per second. When Videotex data is being transmitted using the full channel bandwidth, however, normal video signals can not be sent.

Thus, Videotex systems require a television receiver or set-top box which includes a Teletext-like decoder, a one-way telephone link to the information provider and a keyboard that could be used to make the requests. In response to requests from the user, the information provider sends the requested information as encoded data in the video signal, either in vertical blanking interval, as with Teletext, or using the full video bandwidth of a predetermined television signal.

The response to the request is transmitted to all receivers but is addressed to only one. Only that one receiver will receive and decode the information. Even at the relatively high bandwidths described above, it would be difficult for a Videotex system to process requests from many in a timely manner.

Acquisition of the information or data is accomplished only if the television receiver is tuned to the specific channel that carries the transmission. For Teletext systems to obtain more than a trivial amount of information, the television receiver may need to be tuned to the provider channel while the television is not in use, such as overnight.

Other systems exist for providing information or data through the VBI include the Starsight™ and Gemstar™. These systems provide Electronic Program Guide (EPG) data over predetermined television channels.

Other service providers, such as DirecTV™, Primestar™ and Echostar™, also provide information through special transport packets in a digital data stream of their signals. This same approach will be used by Digital Cable and Wireless Cable services (MMDS).

With the increased popularity of PCs and the advent of the Internet, licensees of WebTV can obtain and display data from the Internet on their television receivers. These systems use a low-cost computer system and a telephone data link to connect to an Internet server. As such, these systems use HyperText Markup Language (HTML) to provide detailed graphical images and accompanying text. Even with relatively high-speed data link, these systems may need minutes or hours to retrieve and display the amount of data that would normally be found in a newspaper article. The computers used by these systems typically include complex processing hardware (actually a personal computer (PC) without secondary storage). The PC simply displays the information in the way it was sent from the Web Site. This system has a drawback in that the graphical format adds excessive overhead and the attendant throughput problems associated with such large blocks of data. The intelligence for responding to subscriber requests for day/date specific information, the graphical form in which it is displayed, the sorting abilities, etc. are under the control of the Web Server.

Another conventional system, as disclosed in U.S. Pat. No. 5,121,476 to Yee, provides information to a viewer via a television receiver display. In this conventional method the digital data is superimposed on the analog video signal at the video signal source. When the video signal is received by the television receiver, the digital data, which appears as low-level noise in the received image, is extracted and stored in a memory for selective access and display of the data. In this conventional method, the decoder may be internal or external to the television receiver.

In another conventional system, information is provided to the viewer by obtaining data via a link. Such a system is described in U.S. Pat. No. 4,751,578 to Reiter et al. In this system the video signal from the antenna or cable TV source is received and demodulated. The data is then converted into video data and mixed with the demodulated video signal received from the antenna or cable TV input. Finally, the combination of video data and demodulated video signal is re-modulated and sent to the input of the television receiver for further processing and display to the viewer.

SUMMARY OF THE INVENTION

The present invention overcomes the above mentioned disadvantages by providing a method and apparatus for requesting, receiving, processing, and providing information from a single local source to a television viewer. First, a television receiver requests the information by accessing a server processor of a local information provider (IP) via a communications link. The specific requested information is downloaded by the information provider to the television receiver via the communications link and is separate and distinct from video information received by the television receiver. The information provided by the IP is minimally formatted and does it include graphical information. The received information is processed, formatted, and provided to the viewer via the display of the television receiver.

According to another aspect of the present invention, the communications link is a telephone line.

According to another aspect of the present invention, the communications link is a cable television line.

According to another aspect of the present invention, the information is aurally provided to the viewer via an audio system.

According to a further aspect of the present invention, a memory is used to store the processed information for later retrieval and display or annunciation to the viewer.

According to another aspect of the present invention, the information is requested at a predetermined time based on either subscriber information or a randomly assigned time determined by the information provider at initial subscription.

According to yet another aspect of the present invention, the requested information includes local information such as movie theater listings, newspaper articles, weather forecasts, advertising, stage productions, local television station and cable station programming information, and the like.

According to another aspect of the present invention, the information is decoded and displayed using the closed caption decoder contained within the television receiver.

According to a further aspect of the present invention, the information is displayed in the foreground of the video image or superimposed on the video image.

According to another aspect of the present invention, the request for information is made using predetermined menu selections by the viewer.

According to another aspect of the present invention, the information provided by the information provider contains time data for updating or resetting the internal clock of the television receiver.

BRIEF DESCRIPTION OF THE DRAWINGS

The invention is best understood from the following detailed description when read in connection with the accompanying drawings, in which.

DETAILED DESCRIPTION

The present invention provides for requesting, receiving, processing and displaying information to a television viewer. The present invention requests information from an Information Provider (IP), such as a local newspaper server, receives the requested information, and processes and displays the information to the viewer.

Figure 1:
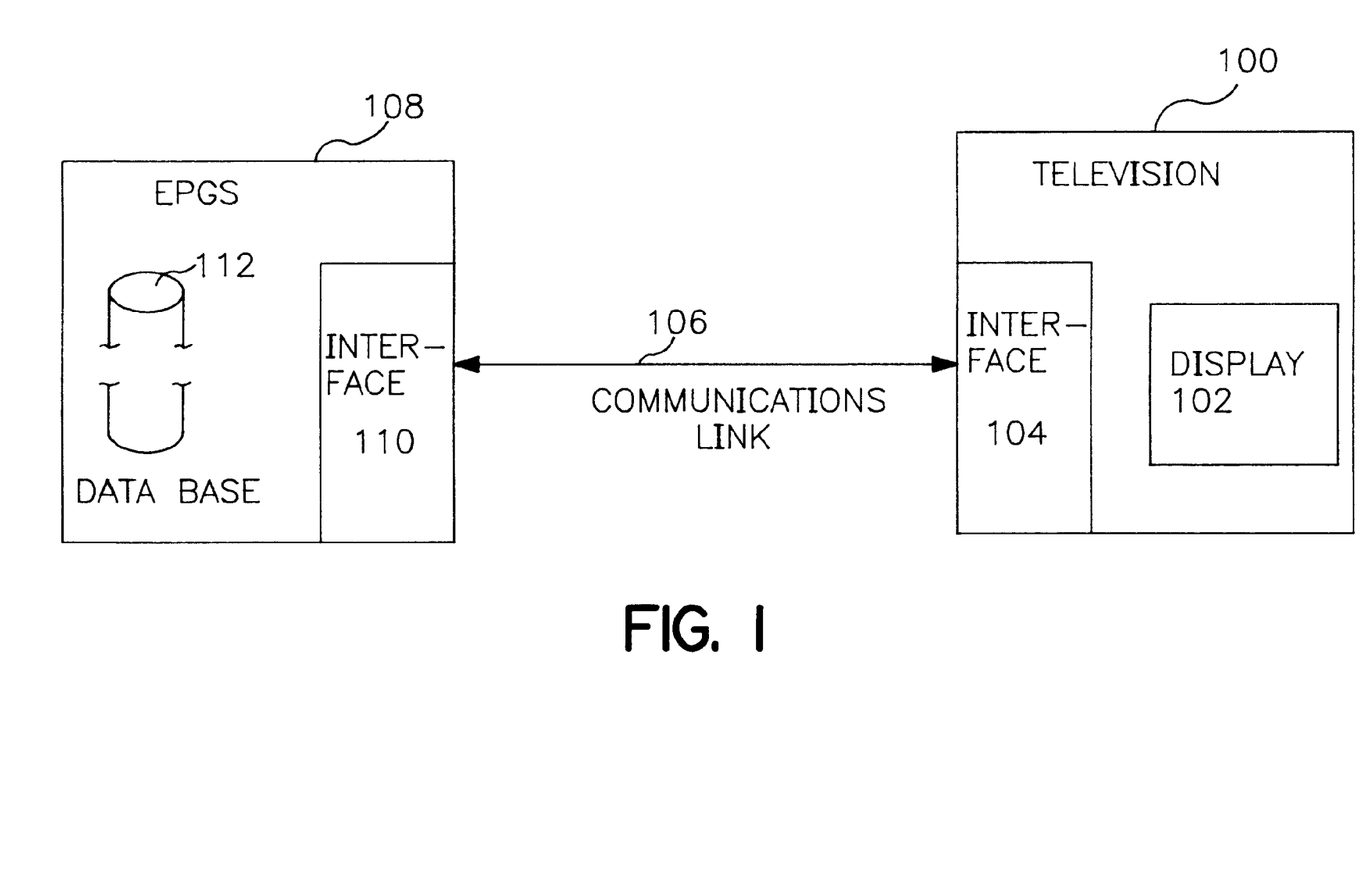
FIG. 1 is a high level functional block diagram of an exemplary embodiment of the present invention.

FIG. 1 is a high level block diagram of the present invention. Television receiver 100 requests information from IP 108 through television receiver interface 104 connected to IP interface 110 via communications link 106. The requested information is obtained from the IP database 112 and transmitted from IP 108 through IP interface 110 over communications link 106 to television receiver interface 104 within television receiver 100. The information is then processed and displayed to the viewer on display 102.

It should be noted that the communication link may be, for example, a telephone link or a cable system service link. The communication link is not limited to these examples, however. In the exemplary telephone link, an interface including a modem with a communication speed of 28.8 Kpbs, for example, may be used. This data rate is significantly higher than the data rate of convention vertical blanking interval (VBI) based systems. The exemplary user interface initiates communication with the IP and controls the communications process.

The request for IP information may be made on demand by the viewer or at a predetermined time. The predetermined time may be selected by IP 108, for example, when a subscriber initially sets up the service, in order to avoid communication delays, and stored in a Non-Volatile Memory (NVM) (not shown) within television receiver 100. This predetermined time is typically during late evening or early morning hours when communication traffic is reduced, although any time of day may be used. In the event that television receiver 100 loses track of time, for example, due too a loss of power for an extended time, IP 108 may update the clock (not shown) contained in television receiver 100 when the data from the next data request is received, or television receiver 100 may attempt to connect to IP 108 automatically at power-up whenever standby power has been lost.

Figure 2:
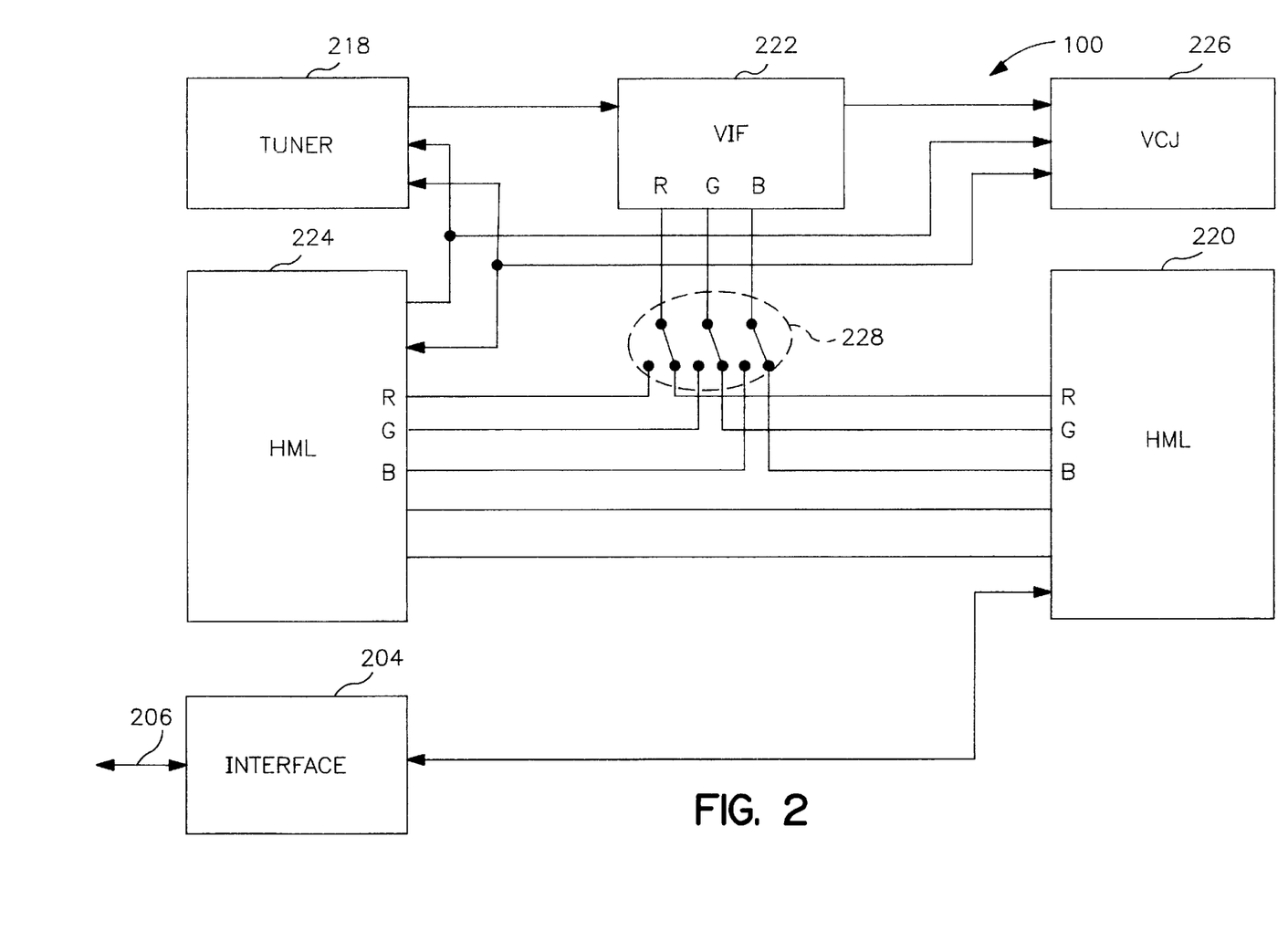
FIG. 2 is a block diagram of a first exemplary embodiment of the present invention.

FIG. 2 shows signal flow and control within television receiver 100. Processor 220 initiates and controls interface 204 to request information from IP 108 over communications link 206. When IP 108 responds with the requested data, interface 204 sends the data to processor 220. Processor 220, which may be, for example, part of the Closed Caption circuit (not shown), decodes and formats the data into RGB data for display. A/V switching circuit 228 is switched to connect the RGB data containing the formatted data to the Video IF (VIF) 222. VIF 222 combines the received information in RGB format, as provided by the closed caption circuit, with the video RGB received from tuner 218 and forwards this combined video to Video Control Jungle (VCJ) logic circuitry 226 for display on the television receiver screen. VCJ logic circuitry 226 controls the timing of the insertion of the generated text into the active video. Processor 220 may also contain or be connected to a memory (not shown) which holds the formatted data for display on the television receiver screen. The use of a memory allows the information to be downloaded and stored as encoded data for future use instead of being displayed as it is received. Processor 224 also controls the display of the on-screen functions of the television receiver, such as volume level, channel number, color, tint, brightness, contrast, etc.

Processor 224 controls the display of the decoded information on the television receiver display. The information may be displayed, for example, superimposed on the video image data or independent of any video image data. The information may be shown on one or several lines at a time and may scroll vertically or horizontally if desired. The information may be placed in an area selected by the viewer, for example, at the bottom of the display. The color of the displayed information may be selected from a predetermined pallet of colors by the viewer. However, if desired, any one or combinations of these features may be eliminated, in order to simplify the system and minimize costs. Additionally, the display size of the information may, for example, be reduced or enlarged from the predetermined display size.

Figure 3:
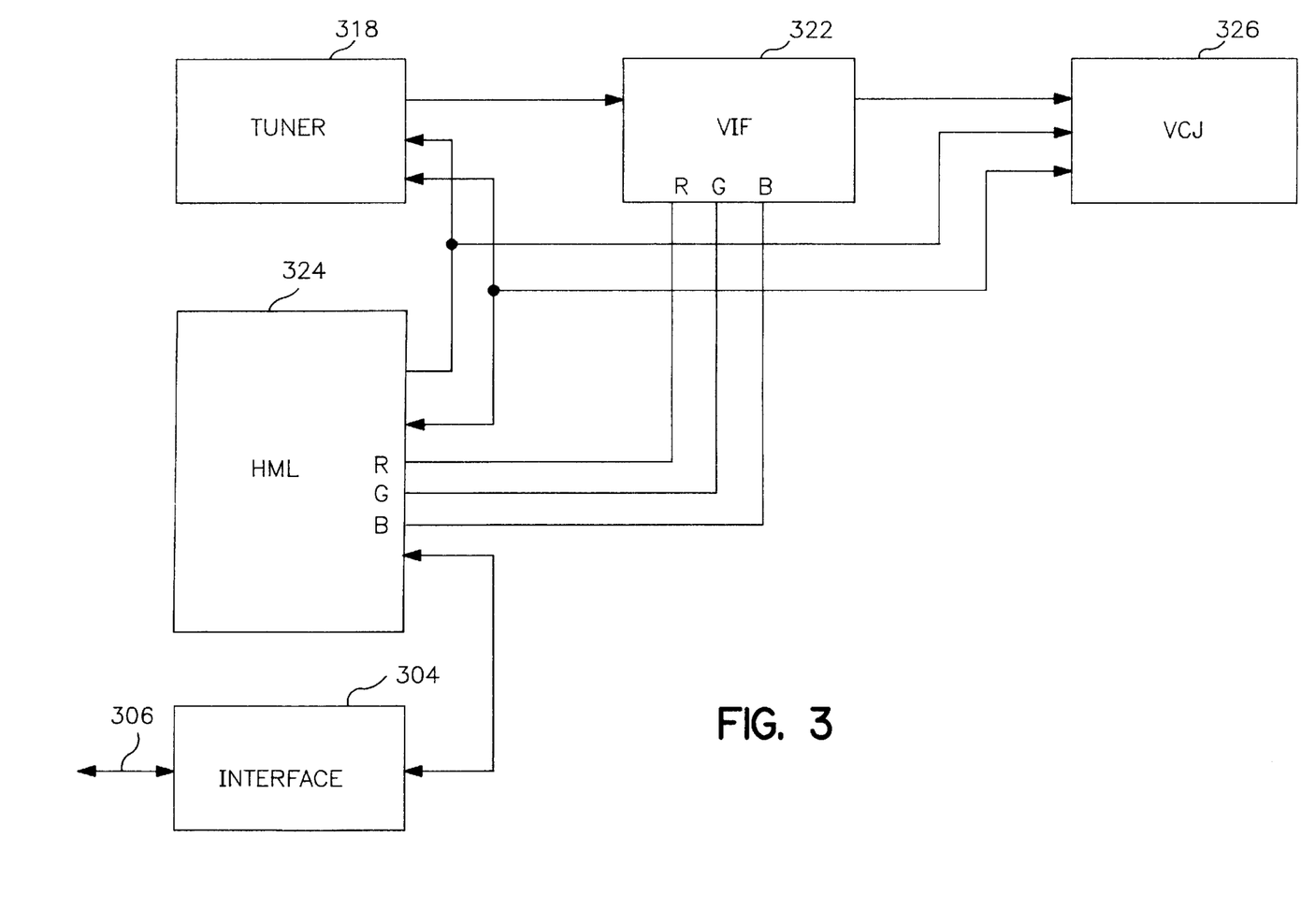
FIG. 3 is a block diagram of a second exemplary embodiment of the present invention.

FIG. 3 shows the signal flow of another embodiment of the present invention. In this example, interface 304, communications link 306, tuner 318, VIF 322, and VCJ 326 correspond to 204, 206, 208, 222, and 226, respectively, as shown in FIG. 2 and are not described further. Processor 324 controls, processes, and formats the data transfer using the circuitry which produces the on-screen display. This simplified version requires very little hardware and is very cost effective. Processor 324 may include or be connected to a memory (not shown), as explained above, to allow for storage and retrieval of data for later display.

The viewer may desire the entire information database or only a portion thereof. For example, the viewer may be able to preselect specific information of interest by using a menu system as shown in Tables 1A–1E. The user determines what data is of particular interest on the main menu as shown in Table 1A. The viewer is then presented with a submenu, such as shown in Tables 1B–1E, for example. This subset of information is then requested by the television receiver and subsequently received, processed and displayed to the viewer. The viewer is then able to more quickly view this subset of information and there is efficient use of the available data bandwidth. The menu system may be provided by the IP, for example.

TABLE 1A

MENU SELECTIONS

| MOVIE LISTINGS | THEATER LISTINGS | SPORTS |
|---|---|---|
| HEADLINES | BROADCAST TV | CABLE SERVICE |
| WEATHER | ADVERTISING | |

TABLE 1B

CABLE SUBMENU:

| ALL TITLES | COMEDIES | DRAMA |
|---|---|---|
| ALL AUDIENCES | MATURE | |
| | TIME RANGE _ TO _ | |

TABLE 1C

MOVIE SUBMENU:

| ALL TITLES | COMEDIES | | | DRAMA | |
|---|---|---|---|---|---|
| ALL RATINGS | G | PG | PG13 R | NC17 | UNRATED |
| LOCAL | CITY-WIDE | | | | |
| ALL TIMES | BEFORE 6 PM | | | AFTER 6 PM | |

TABLE 1D

SPORTS SUBMENU

| LOCAL TEAMS: | RESULTS | ARTICLES |
|---|---|---|
| OTHER TEAMS | RESULTS | ARTICLES |

TABLE 1E

HEADLINE SUBMENU

BOSNIAN PEACE TALKS BREAKDOWN
RESIDENCE OF JAPANESE AMBASSADOR TO CHILE INVADED
SEVERE WEATHER DEVASTATES PACIFIC NORTHWEST
DOW INDUSTRIALS FALL OVER 100 POINTS
OTHER INTERNATIONAL HEADLINES
OTHER NATIONAL HEADLINES
OTHER BUSINESS HEADLINES

It is noted that the submenus allow for multiple choices to limit the amount of data provided. In the Movie submenu for example, in a single menu selection transmission, the user can request times and theater locations for all dramas that are suitable for children and are playing in local theaters before 6 PM. Selections which are obtained from different categories in the menu are combined with a logical AND operation (e.g. G rated and LOCAL theater) while multiple selections in the same category are combined with a logical OR operation (e.g. G rated or PG rated).

In the SPORTS and HEADLINE submenus, above, the viewer is able to select an article of interest for display on the television screen. The requested news article is only provided on-line to the viewer in order to reduce the storage requirements of the television receiver. After the viewer has finished viewing the article the viewer is able to return to the previous menu or the main menu. This may be accomplished by an additional menu selection on the currently displayed menu or by a keypad position on the television receiver remote control device.

In the exemplary embodiment of the invention, the storage in the television receiver includes an 80 character buffer. Received data is displayed from the buffer in two 40 character lines which may be positioned at the top or bottom of the television image. Data is scrolled through the 80 character buffer either on a line-by-line basis or on a character-by-character basis. Also in the exemplary embodiment of the invention, the user may be provided with a FREEZE button on the remote control which stops the scrolling, freezing the information that is currently in the buffer. This operation may or may not notify the server that data display has been stopped. If the server is notified, data continues to be displayed when the FREEZE button is pressed again. If the server is not notified, then any data provided by the server while the display was frozen may be lost.

The server may limit the amount of data provided to the user by using the information provided during enrollment. In the Movie menu, for example, the theaters listed as being "local" may be determined from the subscriber's zip code or telephone exchange and neighboring zip codes or telephone exchanges. For EPG information, the system may also use this information to determine which broadcast channels can be received by the subscriber and provide only that information in response to a request for BROADCAST TV schedules. The subscriber may specify the cable system to which he or she subscribes as well as other systems such as DSS or Primestar. Alternatively, the server may download the scan list contained in the subscriber's television receiver and, using this information and information on the subscriber's location automatically determine to which services the subscriber is connected.

The information from the exemplary IP may be provided with minimal formatting, or as a fixed length text string, and is not laden with graphical information. This allows for hardware simplicity and very low cost. Table 2A illustrates an exemplary implementation of a fixed length text string sent from the IP which contains EPG information.

TABLE 2A

| HEADER | CHANNEL | STATION | START TIME | TITLE | DURATION |
|---|---|---|---|---|---|

HEADER - TYPE OF DATA
      00     Time of Day/MMDDYY
      01     Program data
CHANNEL
      1–999
STATION - 4 Alphanumeric Characters
START TIME - Half hour increments
      00 - 47
      00 - Midnight
      01 - 12:30 AM TABLE 2A-continued

| HEADER | CHANNEL | STATION | START TIME | TITLE | DURATION |
|---|---|---|---|---|---|
| | | | 02 - 1 AM | | |
| | | | . | | |
| | | | . | | |
| | | | . | | |
| | | | 47 - 11:30 PM | | |
| | | | | TITLE - 30 Alpha numeric Characters | |
| | | | | | DURATION - 5 minute increments |
| | | | | | e.g. 20 = 1 hour |

The exemplary text string is made up of a header field, a channel field, a station number field, a start time field, a title field, and a duration field. The text string may be implemented in a number of ways without departing from the spirit of the invention. In this example, information is for the current day. Additional implementations may add fields for date of program.

Table 2B is an example of an exemplary data record for a single program using the exemplary implementation of Table 2A.

TABLE 2B

| 01 | 002 | CBS_ | 38 | MURDER SHE WROTE | 20 |

Channel information for CBS station on channel 2 with a start time of 7 PM for Murder She Wrote which lasts for 1 hour.

In addition, the data from the IP may contain additional information which may be used by the television receiver to format the data prior to display so as to provide the viewer with more than program title and time information.

The information may be displayed in a variety of ways. In order to reduce hardware and keep costs low, the closed caption circuitry contained within the television receiver may be used to decode and display the information to the viewer. In this case, the information may be displayed according to the closed caption hardware. Examples of closed caption decoder hardware are discussed in an article by M. Harigai et al. entitled "LSI Chip Set for Closed Caption Decoder System", *IEEE Transactions on Consumer Electronics*, vol. 37, no. 3 pp. 449–454 (August 1991), and in a paper by U. Moller et al. entitled "A Single Chip Solution for Closed-Caption Decoding", *IEEE Transactions on Consumer Electronics*, vol. 38, no. 3, pp. 274–278 (August 1992). However, the present invention is not limited in this sense and may also employ addition enhancements for high end, high performance television receivers to improve graphical resolution of the displayed information.

Additional circuitry may be added to provide the viewer with various options for displaying the information provided by the closed caption decoder. For example, the user may wish to superimpose the information on the video display without occluding a portion of the display, or occluding a small portion such as that which occurs in a closed caption display. Furthermore the viewer may wish to adjust the rate at which the information is presented. If so desired, the viewer may display the data on a blank screen (without a video image) in various formats, such as 20 rows of 40 characters each. This display format may be fixed in order to simplify hardware and reduce cost or, in higher end television receivers, may be varied by the viewer if desired.

Table 3A is an example of how the program information may be displayed on the television receiver screen. The display may indicate the channel designation CH, station name STATION, start time TIME, title TITLE, duration LENGTH, as well as the current time of day. The display may also allow the viewer to select SEL a program directly from the display for viewing. This selection may also be accomplished by highlighting the desired program on the display or by any other means that a selection may be indicated. The title may be abbreviated or truncated in order to meet a fixed field requirement.

TABLE 3A

| SEL | CH | STATION | TIME | TITLE | 6:55 PM LENGTH |
|---|---|---|---|---|---|
| | 2 | CBS | 7 PM | MURDER SHE WROTE | 1:00 |
| * | 3 | NBC | 7 PM | NATIONAL NEWS | :30 |
| | 4 | HBO | 7 PM | FREE WILLY 2 | 1:50 |

Tables 3B and 3C show examples of an abbreviated title and a title truncated to 10 characters, respectively. As mentioned above, the title is formatted at the IP source.

TABLE 3B

| SEL | CH | STATION | TIME | TITLE | 6:55 PM LENGTH |
|---|---|---|---|---|---|
| | 2 | CBS | 7 PM | MURDR SHE WROT | 1:00 |
| * | 3 | NBC | 7 PM | NAT NEWS | :30 |
| | 4 | HBO | 7 PM | FREE WLY 2 | 1:50 |

TABLE 3C

| SEL | CH | STATION | TIME | TITLE | 6:55 PM LENGTH |
|---|---|---|---|---|---|
| | 2 | CBS | 7 PM | MURDER SHE | 1:00 |
| * | 3 | NBC | 7 PM | NATIONAL N | :30 |
| | 4 | HBO | 7 PM | FREE WILLY | 1:50 |

Table 4 is an example of how the local movie information may be displayed on the television receiver screen. The display may indicate the theater name THEATER, start time TIME, title TITLE, duration LENGTH, rating RATE, cost per ticket COST, as well as the current time of day. The display may also allow the viewer to order ORDER tickets in advance for a particular showing. This selection may also be accomplished by highlighting the desired movie on the display or by any other means that a selection may be indicated (such as the entry of a number to represent the quantity of tickets desired). As explained above, the title may be abbreviated or truncated in order to meet a fixed field requirement.

TABLE 4

| ORDER | THEATER | TIME | TITLE | RATE | COST | 3:25 PM LENGTH |
|---|---|---|---|---|---|---|
|  | CINEPLEX | 7 PM | JURASSIC PARK | PG | $6.00 | 1:55 |
| *4 | GCC SOUTH | 7 PM | JUDGE DREDD | R | $5.50 | 1:52 |
|  | AMC NORTH | 7 PM | FREE WILLY 2 | G | $6.00 | 1:50 |

Figure 4:
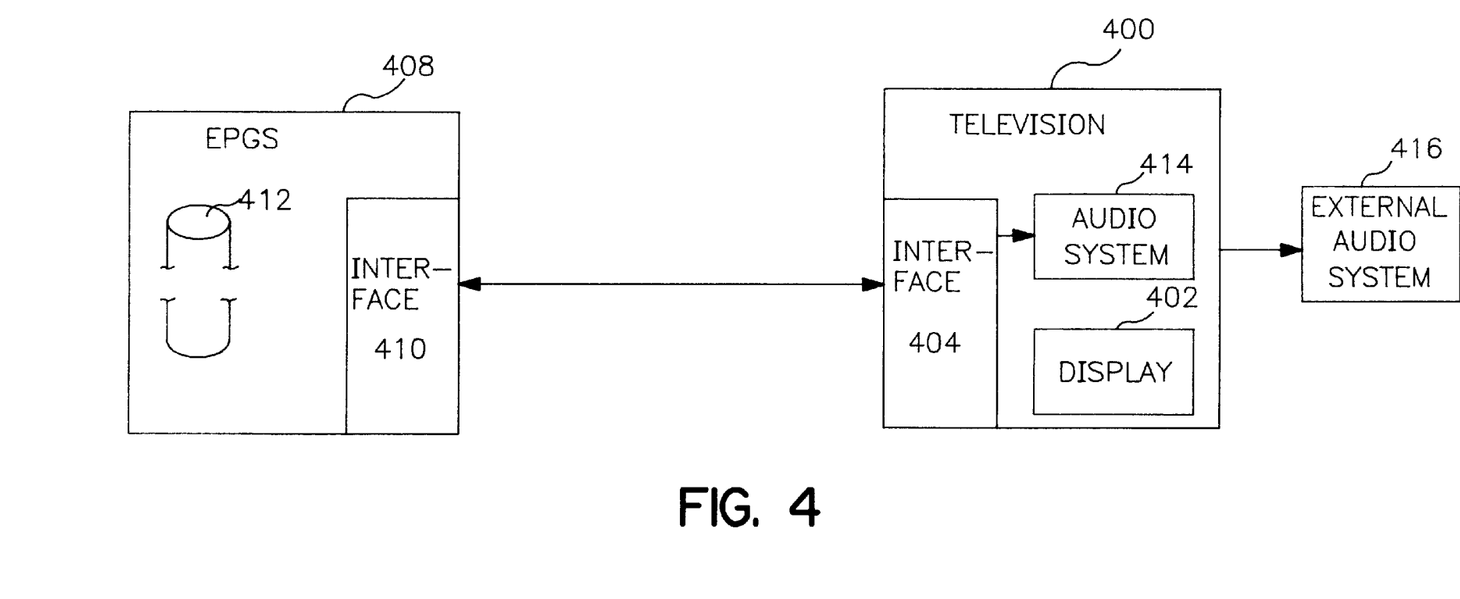
FIG. 4 is a high level functional block diagram of another exemplary embodiment of the present invention.

Although the invention as described above is directed to display of information on a television receiver, the invention is not limited to that embodiment. Referring to FIG. 4, a second embodiment of the present invention is explained. In this embodiment, the information may be aurally presented to the viewer. In this way the viewer may concentrate on the video display while listening to the EPG. This mode of transmission may be of particular interest to sports enthusiasts who are more interested in the video portion of a sporting event and desire a quick way of receiving information on other sports scores without looking away from the game.

In this embodiment, the audio presentation may be provided by the internal audio system 414 of the television receiver or through an external audio system 416. The retrieved information, as in the first embodiment, may be predefined by the user via a menu system.

Furthermore, the audio information 416 may be mixed with the audio signal of the video display or may replace the audio portion of the program.

Figure 5:
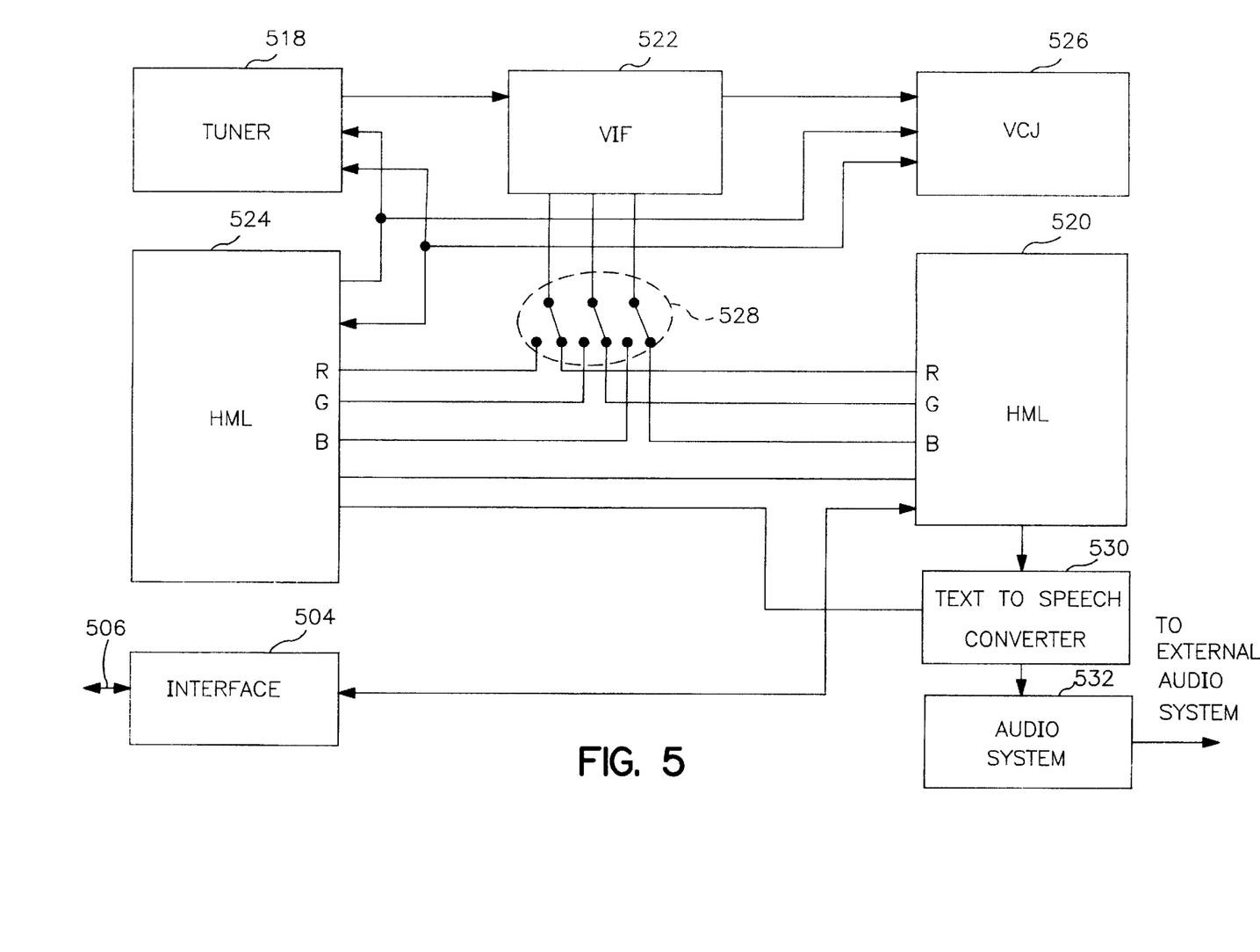
FIG. 5 is a block diagram of the exemplary embodiment of FIG. 4.

FIG. 5 shows the signal flow and control within the television receiver for this embodiment. In this figure, elements 504, 506, 518, 520, 522, 524, 526, and 528 perform at least the identical functions of elements 204, 206, 218, 220, 222, 224, 226, and 228, respectively, of FIG. 2. In addition, processor 524 controls text to audio converter 530 (converter). Converter 530 may, for example, be implemented in hardware, software or a combination of hardware and software. Converter 530 receives text data from processor 520 and, under control of processor 524, converts this text into audio information. This audio information is provided to audio system 532 and/or to external audio system 408 (shown in FIG. 4). The audio information may be presented to the viewer in lieu of, or as an enhancement to, the visual presentation of information from the IP. Additional information on the preprocessing of text prior to conversion to speech can be found in O'Malley, "Text-to-Speech Conversion Technology", Computer, Vol. 23, No. 8, August 1990, pp. 17–23, which is incorporated herein by reference.

Although the invention is illustrated and described herein, the invention is not intended to be limited to the details shown. Rather, various modifications may be made in the details within the scope and range of equivalents of the claims and without departing from the invention.

The invention claimed is:

1. An apparatus to provide a subscriber with information on a television receiver for use with an Information Provider (IP), the television receiver having a display screen and including an on-screen display processor which displays operational data on the display screen with active video information from a video input signal to provide a user interface for adjusting operational functions of the television receiver, the apparatus comprising, a bi-directional communication link interconnecting the television receiver and the IP, requesting means in the television receiver for requesting data over the bi-directional communication link, receiving means in the television receiver for receiving the requested data over the bi-directional communication link, the requested data being separate from the video input signal received by the television receiver, processing means for processing the data from said receiving means into formatted text information, and display means, using the on-screen display processor of the television receiver to display the formatted text information from said processing means on the display screen of the television receiver, wherein the information includes a database containing local information.

2. Apparatus according to claim 1, further comprising:

memory means for storing the received data from said receiving means, wherein said processing means processes the data from said memory means into the formatted text information.

3. Apparatus according to claim 2, wherein the processing means includes a closed caption device for decoding data conforming to a closed-caption protocol.

4. Apparatus according to claim 3, wherein the display means displays the data in a foreground portion of a received video image.

5. Apparatus according to claim 4, wherein the processing means includes menu generating means for generating a predetermined menu in a format to be displayed using the on screen display processor of the television receiver.

6. Apparatus according to claim 1, wherein the processing means includes an internal clock which is updated by the IP when the requesting means requests time data.

7. Apparatus according to claim 1, wherein:

the processing means generates a scan list which is provided to the IP by the requesting means, and the IP uses the scan list to limit television program information provided to the television receiver in response to a request for television program schedule information.

8. Apparatus according to claim 1, wherein the communications link is a telephone connection, the IP includes means for receiving telephone exchange information of the subscriber with a request for information and means for using the received telephone exchange information to determine at least one of:

i) available television stations, ii) local movie theaters, and iii) local stage theaters.

9. Apparatus according to claim 1, wherein the bi-directional communication link is a cable television line.

10. Apparatus according to claim 1, further comprising:

conversion means, including a text-to speech converter, for converting the received data into audio information, and audio processing means for providing the audio information to a speaker system of the television receiver.

11. Apparatus according to claim 10, wherein said audio information is substituted for an audio signal of a respective video input signal.

12. Apparatus according to claim 10, wherein said audio information is blended with an audio signal of a respective video input signal.

13. Apparatus according to claim 1, wherein the requested data includes local information comprising at least one of:
1) a newspaper article,
2) a movie theater listing,
3) weather information,
4) advertising,
5) Electronic Program Guide information, and
6) a stage production listing.

14. A method for providing selected local information from an Information Provider (IP) to a television receiver with an on screen display function which displays operational data to provide a user interface for adjusting operational functions of the television receiver, the method comprising the steps of:
a) connecting the television receiver and the IP with a bi-directional communications link,
b) requesting data from the IP over the bi-directional communications link,
c) receiving the data at the television receiver over the bi-directional communications link,
d) storing the received data into a memory,
e) processing the stored data into formatted text information, and
f) displaying the formatted text information with active video using the on-screen display function of the television receiver,
wherein the data contains TV schedule information for selected local broadcast TV stations.

15. A method according to claim 14, wherein the requested data is local information including at least one of:
1) a newspaper article,
2) a movie theater listing,
3) weather information,
4) advertising,
5) Electronic Program Guide information, and
6) a stage production listing.

* * * * *